US 8,390,959 B2

(12) United States Patent
Fasen et al.

(10) Patent No.: US 8,390,959 B2
(45) Date of Patent: Mar. 5, 2013

(54) ACTUATOR WITH NON-MOVING MASS

(75) Inventors: Donald J Fasen, Boise, ID (US); James C Anderson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 13/070,885

(22) Filed: Mar. 24, 2011

(65) Prior Publication Data

US 2012/0243124 A1 Sep. 27, 2012

(51) Int. Cl.
*G11B 5/55* (2006.01)

(52) U.S. Cl. .................................................. 360/261.1

(58) Field of Classification Search ............... 360/261.1, 360/261.2, 261.3, 241

See application file for complete search history.

(56) References Cited

U.S. PATENT DOCUMENTS

| 3,979,773 | A  | * | 9/1976  | Sawazaki et al. ............. 386/307 |
| 6,333,838 | B1 | * | 12/2001 | Anderson .................. 360/261.1 |
| 6,594,118 | B1 | * | 7/2003  | Nayak et al. ............... 360/261.1 |
| 7,372,660 | B1 | * | 5/2008  | Subrahmanyan .......... 360/78.09 |
| 7,502,196 | B2 | * | 3/2009  | Nayak et al. .................... 360/75 |
| 7,679,864 | B2 | * | 3/2010  | Nayak et al. .............. 360/261.1 |

* cited by examiner

*Primary Examiner* — Angel A. Castro
(74) *Attorney, Agent, or Firm* — Steven L. Webb

(57) ABSTRACT

An actuator for a tape drive is disclosed. The actuator has a moving mass and a non-moving mass. The non-moving mass is at least 107 grams.

15 Claims, 6 Drawing Sheets

ACTUATOR WITH NON-MOVING MASS

BACKGROUND

The track density in linear tape drives is increasing. The increased track density requires better positional accuracy for the actuator that positions the drive head over the tape. Actuator resonance is one of the main limiters for the bandwidth of the head positioning actuator. One type of resonance in the head actuator system is due to the reaction force resulting from moving the mass of the drive head across the tape.

DETAILED DESCRIPTION

FIGS. 1-4, and the following description depict specific examples of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1A:
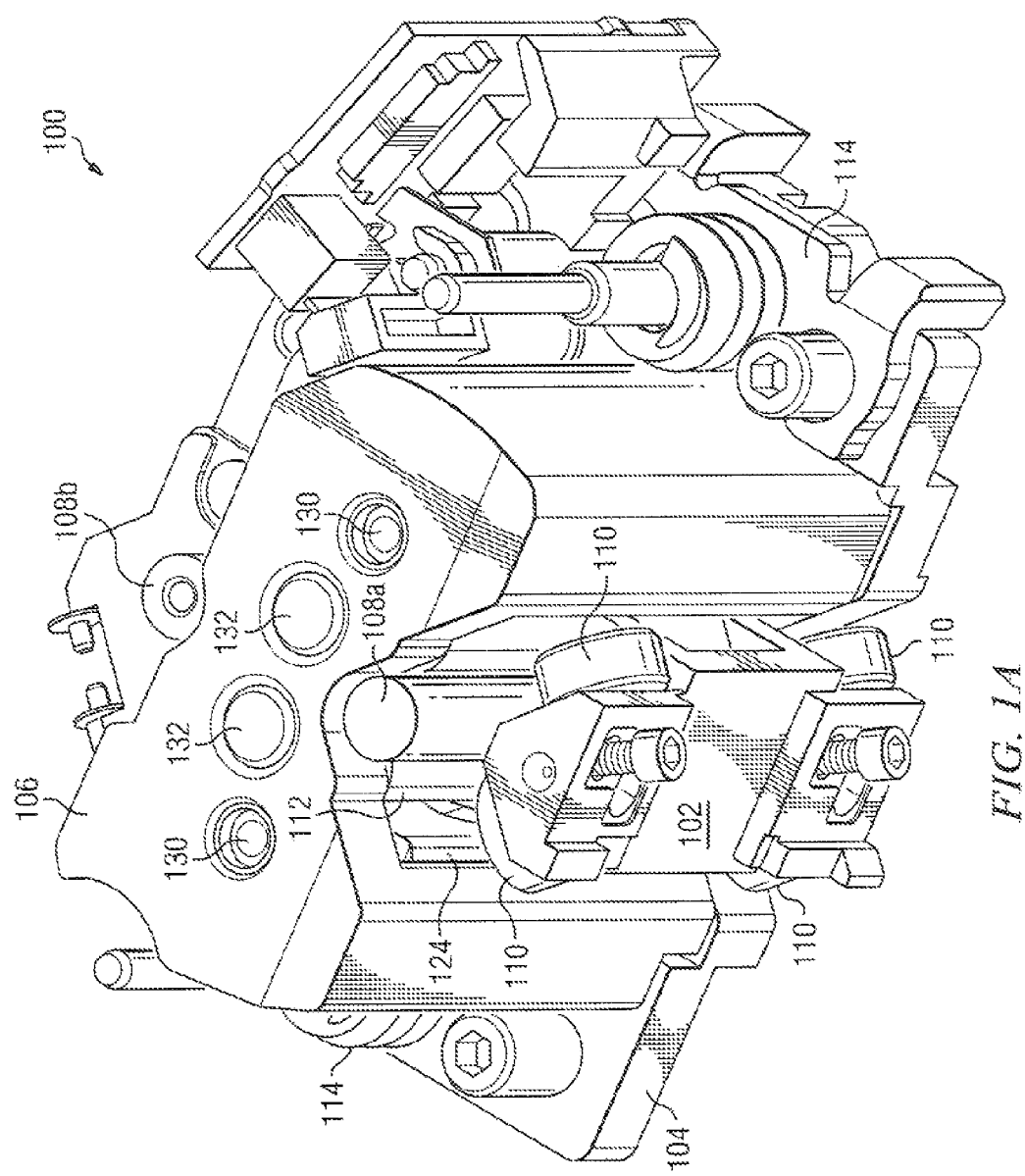
FIG. 1A is an isometric top/front view of an actuator assembly 100 in an example embodiment of the invention.

FIG. 1A is an isometric top/front view of an actuator assembly 100 in an example embodiment of the invention. Actuator assembly 100 comprises an actuator base 104, head assembly 102, magnet bracket 106, two bearing support rods 108a and 108b, inner pole piece 112, two permanent magnets 124 (only one can be seen), plastic bumpers 130, slugs 132, and mounting hardware 114. Head assembly 102 is shown without a magnetic head attached (for clarity).

Figure 1B:
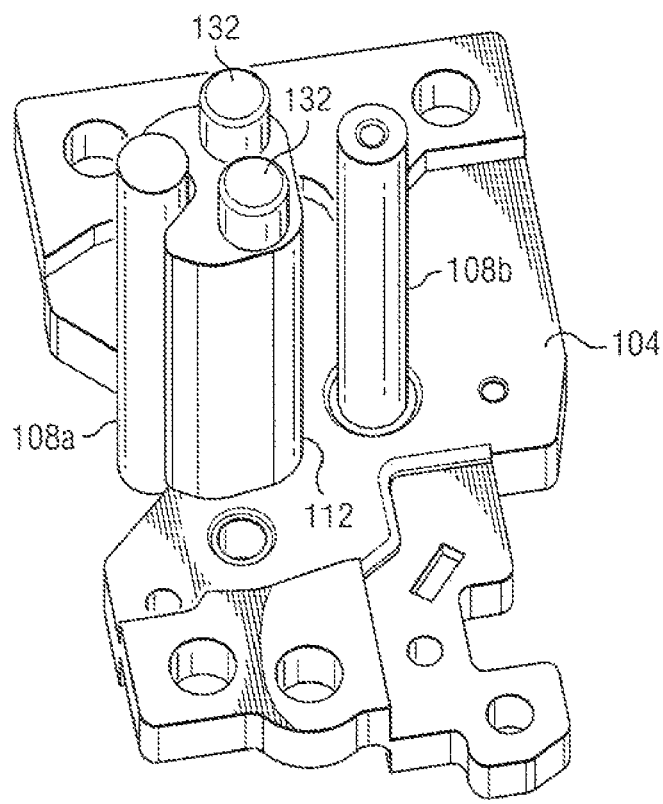
FIG. 1B is an isometric side view of a partially assembled actuator assembly 100 in an example embodiment of the invention.

FIG. 1B is an isometric side view of a partially assembled actuator assembly 100 in an example embodiment of the invention. During assembly the inner pole piece 112 is bolted to the top side of actuator base 104. The front bearing support rod 108a is attached to the front face of the inner pole piece 112 using glue or epoxy. The rear bearing support rod 108b is attached to the top side of actuator base 104, behind the inner pole piece 112, using glue or epoxy. The two slugs 132 fit inside holes formed in the magnet bracket 106 and are held against the inner pole piece 112 by a magnetic force. The two slugs aid in the completion of the magnetic circuit by closing any tolerance gap between the top surface of the inner pole piece and the magnet bracket.

Figure 1C:
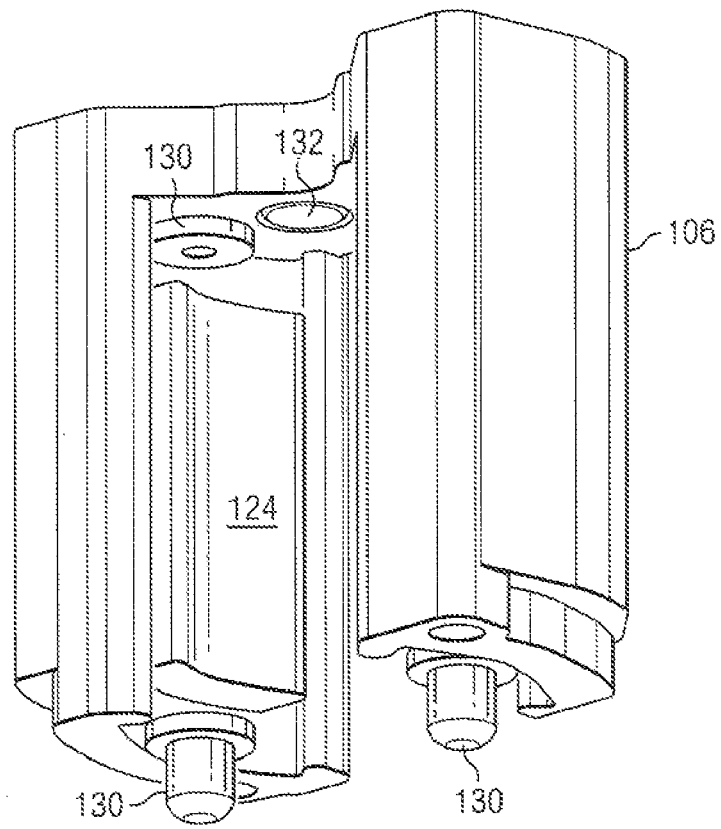
FIG. 1C is an isometric view of a magnet bracket in an example embodiment of the invention.

FIG. 1C is an isometric view of a magnet bracket in an example embodiment of the invention. The two permanent magnets 124 are attached to cavities formed inside the magnet bracket 106 using glue or epoxy. The two upper plastic bumpers 130 fit into holes formed inside the magnet bracket and are positioned to limit the travel of head assembly 102. The two lower plastic bumpers 130 fit into holes formed inside the actuator base 104 and are positioned to limit the travel of head assembly 102. The bottom of the magnet bracket is bolted to the top side of actuator base 104. Slug 132 is shown in the hole through the top of the magnet bracket.

Figure 1D:
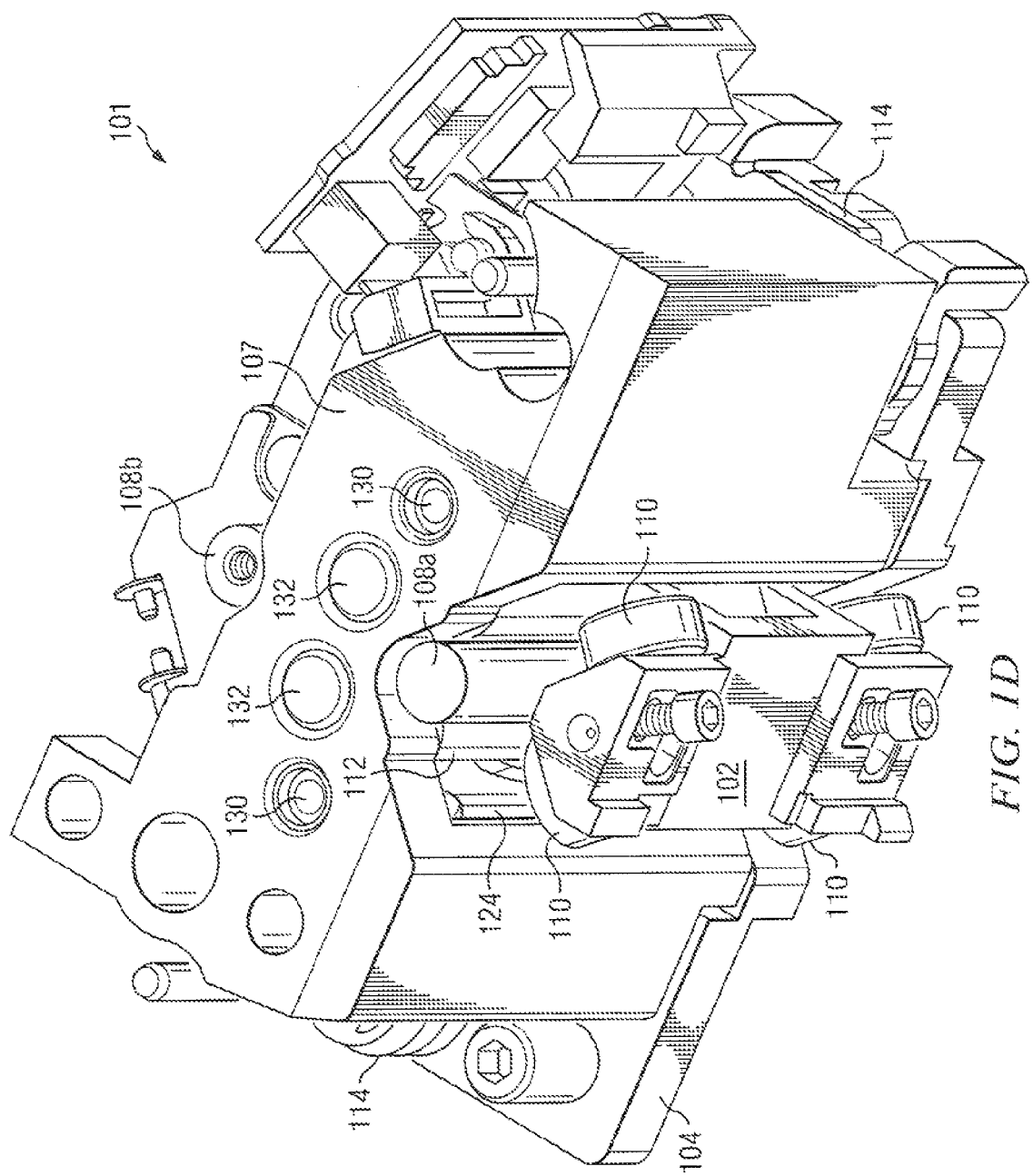
FIG. 1D is an isometric top/front view of an actuator assembly 101 in an example embodiment of the invention.

FIG. 1D is an isometric top/front view of an actuator assembly 101 in an example embodiment of the invention. Actuator assembly 101 comprises an actuator base 104, head assembly 102, magnet bracket 106, two bearing support rods 108a and 108b, inner pole piece 112, two permanent magnets 124 (only one can be seen), plastic bumpers 130, slugs 132, and mounting hardware 114. Head assembly 102 is shown without a magnetic head attached (for clarity). Magnet bracket 107 in actuator assembly 101 is heavier than the magnet bracket 106 in actuator assembly 100. Mass has been added by extending both the left and right sides on magnet bracket 107. Holes through the top of magnet bracket 107 allow access to mounting hardware 114.

Figure 2A:
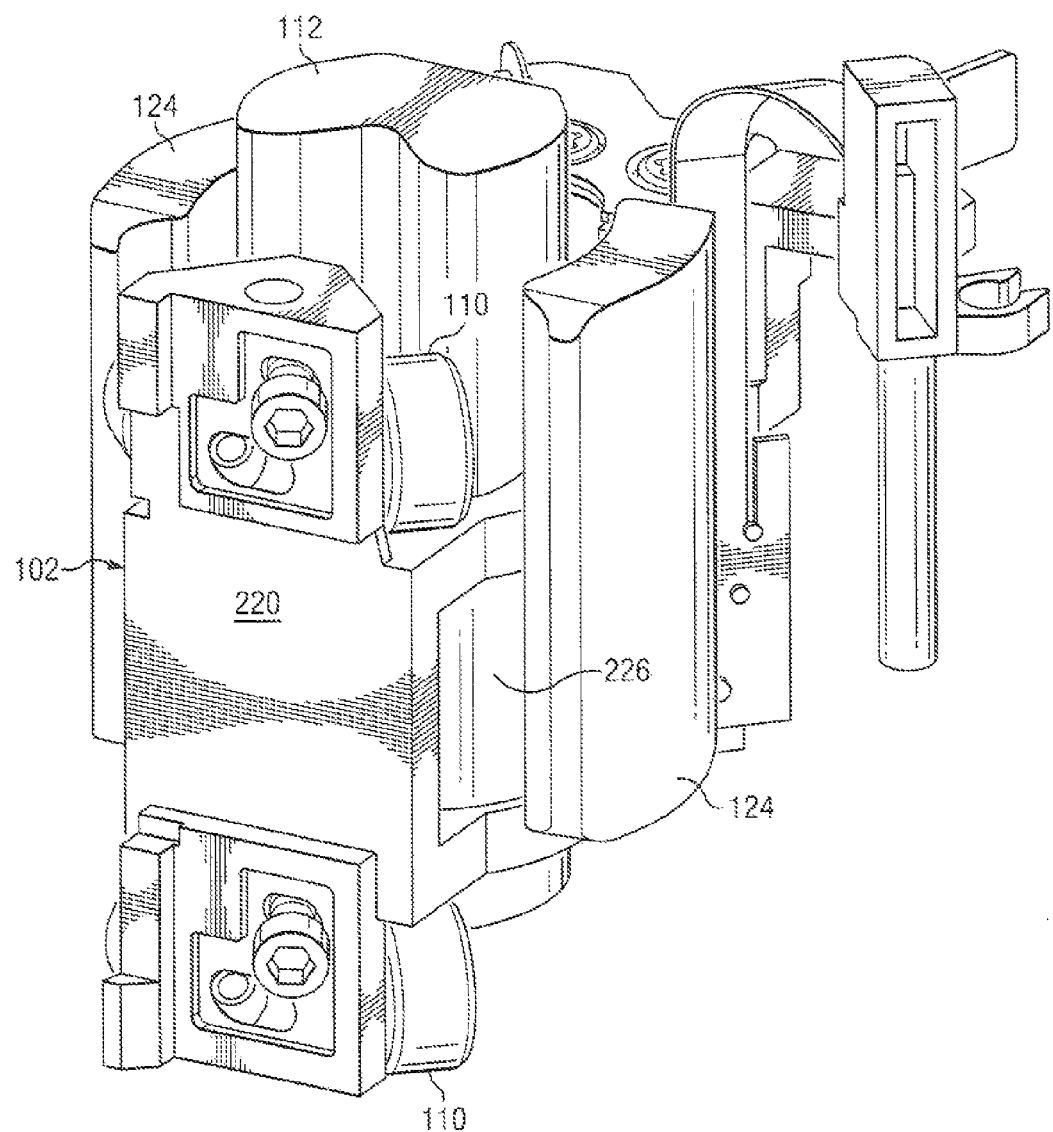
FIG. 2A is an isometric view of some parts of the magnetic circuit of actuator assembly 100 in an example embodiment of the invention.
Figure 2B:
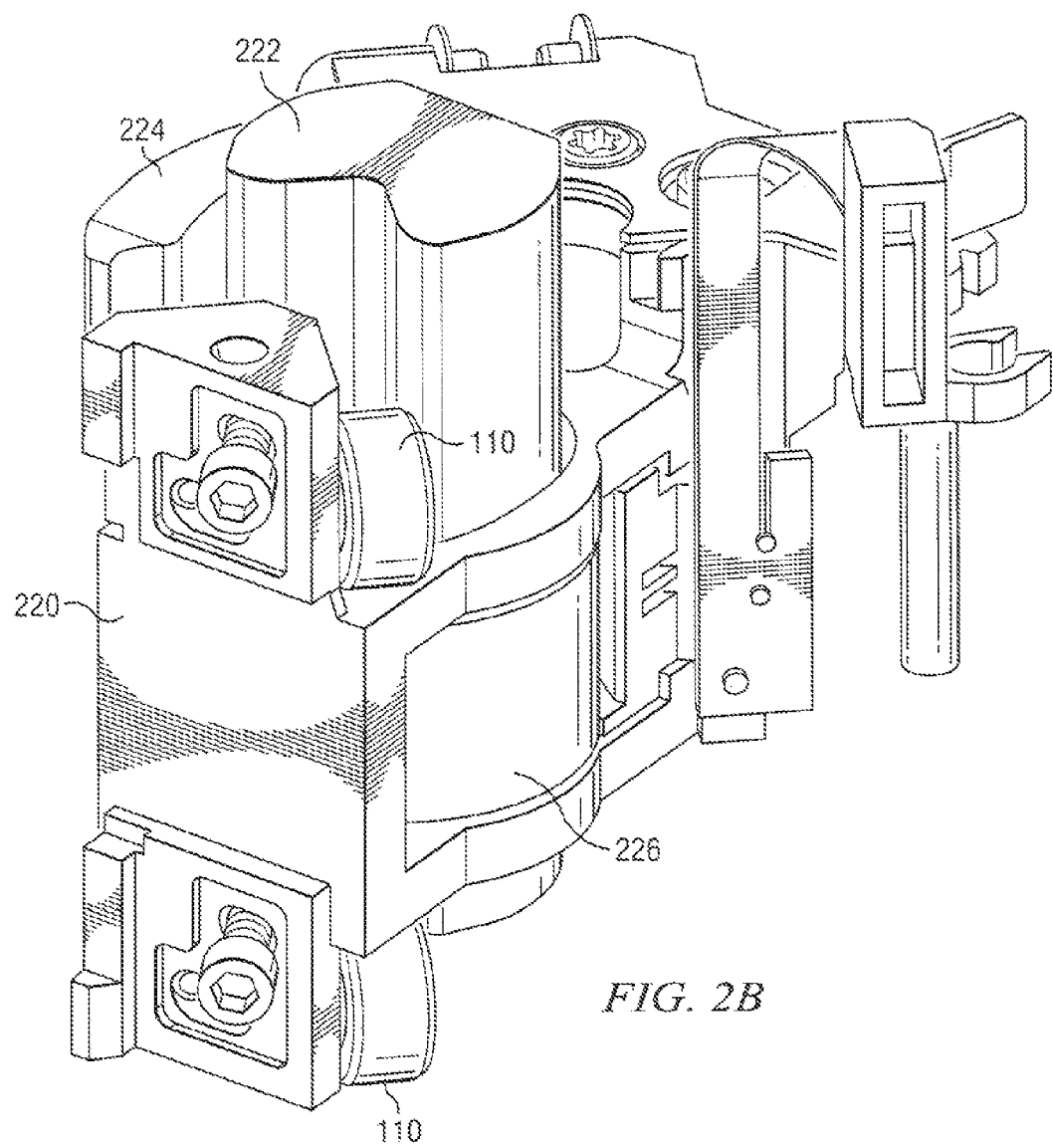
FIG. 2B is the same as FIG. 2A with one of the permanent magnets 224 removed (for clarity).

FIG. 2A is an isometric view of some parts of the magnetic circuit of actuator assembly 100 in an example embodiment of the invention. Head assembly 102 comprises coil bracket 220, coil 226 and roller bearings 110. Coil 226 is attached to coil bracket 220. Inner pole piece 112 fits inside coil 226. Permanent magnets 124 are mounted inside magnet bracket 106 (not shown) and positioned on either side of coil 226. Head assembly 102 moves up and down vertically. The roller bearings in head assembly ride along the bearing support rods. Bearing support rods 108a and 108b are not show (for clarity). FIG. 2B is the same as FIG. 2A with one of the permanent magnets 224 removed (for clarity). A magnetic field is formed in the gap between inner pole piece 112 and the two permanent magnets 224. As can be seen in FIGS. 2A and 2B, coil 226 is positioned in the magnetic field between inner pole piece 112 and the two permanent magnets 224. The two permanent magnets 224 and the inner pole piece 112 are held in place by magnet bracket 106 and actuator base 104. The magnet bracket 106, actuator base 104 and slugs 132 also complete the magnetic circuit of the actuator system.

The head assembly 102 with the magnetic tape head attached, comprises the moving mass of the actuator system. In operation, head assembly 102 is moved to different vertical positions as coil 226 is energized. When the coil 226 is energized, the current flowing through the coil 226 inside the magnetic field creates a force that displaces the coil 226 vertically. As the coil 226 moves, the coil bracket 220 and the magnetic head move with it.

An equal but opposite force, called the reaction force, acts against the non-moving mass of the actuator. The non-moving mass of an actuator system is the mass of the parts that oppose the force used to accelerate the moving mass. In one example embodiment of the invention, the non-moving mass comprises the mass of the magnet bracket 106, the two bearing support rods 108, the inner pole piece 112, the two permanent magnets 124, the plastic bumpers 130, the slugs 132, part or all of the mass of the actuator base 104 and the screws used to attach the magnet bracket 106 and inner pole piece 112 to the actuator base 104. The reaction force is transmitted from the two permanent magnets 224 and the inner pole piece 112 into the parts that are directly attached to them. The magnet bracket 106, actuator base and the two bearing support rods are directly attached to the two permanent magnets 224 and the inner pole piece 112. The two slug and the 4 plastic bumpers are directly attached to magnet bracket.

Figure 3:
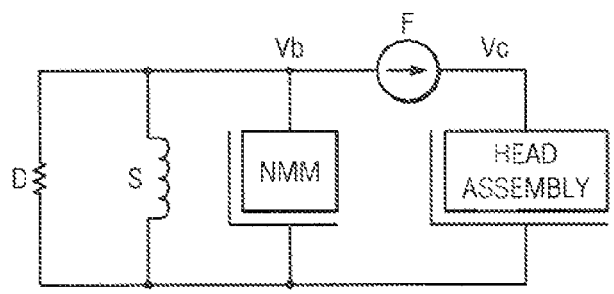
FIG. 3 is a simplified model of the actuator system in an example embodiment of the invention.

The reaction force acts against the non-moving mass of the actuator system. FIG. 3 is a simplified model of the actuator system in an example embodiment of the invention. F represents the force applied to the moving mass (the head assembly) when the coil is energized. The reaction force is applied to the non-moving mass. The non-moving mass can induce structural resonances modeled as a spring-damper (S and D). The force from damping F is equal to the damping constant $\beta$ times the velocity v or $F=\beta*v$. The force from the spring F is equal to the spring constant K times the displacement X or $F=K*X$. The force F acting on the mass M is equal to the mass times the acceleration a or $F=M*a$.

Solving for V/F in each equation gives the following equations:

$V/F = 1/\beta$ Damping $V/F = s/K$ Spring (where s is seconds)

$V/F = 1/(M*s)$ Mass (where s is seconds)

Therefore the velocity of the head assembly Vha (the moving mass) is give by:

$Vha = F/(s*Mha)$

The velocity Vnmm of the non-moving mass is give by:

$Vnmm = F/(s*Mnmm + \beta + K/s)$

The response of the system T is:

$$T = (Vha - Vnmm)/F = 1/(s*Mha) - 1/(s*Mnmm + \beta + K/s) \quad \text{Eq. 1}$$

$$T = 1/(s*Mha) - (s/Mnmm)/(s^2 + s*\beta/Mnmm + K/Mnmm)$$

$$T = \frac{1}{s*Mha} * \frac{[s^2 * (1 - Mha/Mnmm) + s*(\beta/Mnmm + K/Mnmm)]}{s^2 + s*(\beta/Mnmm + K/Mnmm)}$$

The first term $1/(s*Mha)$ in equation 1 is the desired response and the second term is the error in the system response. As can be seen, reducing the mass of the head assembly Mha will improve the response of the system T. The error term in the equation can be reduced by increasing the non-moving mass (Mnmm) and/or decreasing the ratio of the mass of the head assembly (the moving mass) over the non-moving mass (Mha/Mnmm). Therefore increasing the non-moving mass Mnmm and/or decreasing the mass of the head assembly will reduce the error in the response of the system.

The mass of the parts that comprise the non-moving mass is given in table 1 in one example embodiment of the invention.

TABLE 1

| Part | Mass |
| --- | --- |
| Magnet bracket | 29 grams (original) |
| Bearing support rods (2) | 3.2 * 2 = 6.4 grams |
| inner pole piece | 14.5 grams |
| permanent magnets (2) | 7.1 * 2 = 14.2 grams |
| Slug (2) | 0.47 * 2 = 0.94 grams |
| Plastic bumper (4) | 0.04 * 4 = 0.16 grams |
| Actuator base | 32.8 grams |
| Screws | .26 * 2 = .52 grams |
| Total mass | 98.5 grams |

The moving mass of the actuator was 13 grams. The total non-moving mass of the original actuator was approximately 98.5 grams. With the 13 gram moving mass, the ratio of the moving mass to the non-moving mass was approximately 0.1320. In one example embodiment of the invention, the mass of the magnet bracket was increased from 29 grams to 73 grams, changing the non-moving mass from approximately 98.5 grams to approximately 142.5 grams (a 47% increase). This changed the ratio of the moving mass to the non-moving mass to approximately 0.0912. In another example embodiment of the invention, the mass of the magnet bracket was increased from 29 grams to 39 grams, changing the non-moving mass to approximately 108.5 grams (an 11% increase). This changed the ratio of the moving mass to the non-moving mass to approximately 0.1198. In another example embodiment of the invention, the mass of the magnet bracket was increased from 29 grams to 200 grams, changing the non-moving mass to approximately 269.5 grams. This changed the ratio of the moving mass to the non-moving mass to approximately 0.0482.

Figure 4:
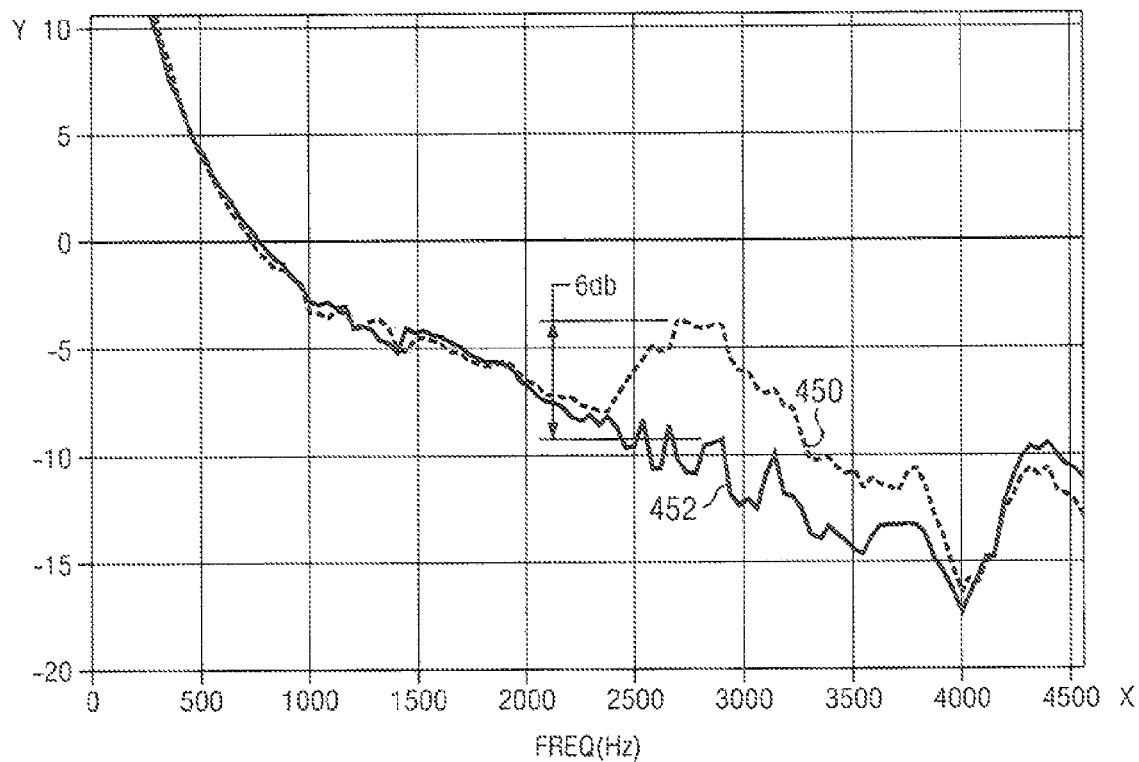
FIG. 4 is a graph of the frequency response of an actuator in an example embodiment of the invention.

FIG. 4 is a graph of the frequency response of an actuator in an example embodiment of the invention. The x-axis is the frequency and the y-axis is the magnitude of the response. Line 450 shows the frequency response of an actuator with the original non-moving mass. Line 452 shows the frequency response of an actuator with increased non-moving mass. The resonance around 2800 Hz is known to be caused by the reaction force from accelerating the moving mass. As can be seen, the resonance in this frequency range was reduced by around 6 db to −9 db, or approximately cut in half.

Increasing the mass of the non-moving component of the actuator lowers the frequency response and decrease the magnitude of the vibration of the non-moving components. In the example describe above, the mass of the magnet bracket was increased. In other example embodiments the added mass can be distributed to other parts that make up the non-moving mass, for example the bearing support rods or the underside of the actuator base. In addition, the moving mass can be lightened to improve the ratio of the moving mass to the non-moving mass. In one example embodiment of the invention the moving mass was reduced to 11 grams.

In some example embodiments of the invention, the actuator base is attached to a tape drive using a three point mounting system extending through the bottom of the actuator base, for example the mounting hardware 114. The three point mount allows the axis of motion of the actuator head to be adjusted such that it is perpendicular to the tape. The mounting hardware takes up space on the actuator base. The area of the actuator base that supports the mounting hardware is not directly attached to the magnet bracket 106. Because some of the mass of the actuator base is not directly under the magnet bracket 106, only part of the total mass of the actuator base may be counted as part of the non-moving mass. In one example embodiment of the invention, between 75% and 100% of the mass of the actuator base will be included as part of the non-moving mass. In other embodiments, only the mass of the magnet bracket, permanent magnets, and the inner pole will be considered as the non-moving mass.

Table 2 shows the ratio of the moving mass to the non-moving mass for the heaver non-moving masses and two different moving masses.

TABLE 2

Ratio of moving mass over the non-moving mass

|  | Moving mass of 13 grams | Moving mass of 11 grams |
| --- | --- | --- |
| Non-moving mass of 108.5 (100% of actuator base) | 0.1198 | 0.1014 |
| Non-moving mass of 100.3 (75% of actuator base) | 0.1296 | 0.1097 |
| Non-moving mass of 142.5 (100% of actuator base) | 0.0912 | 0.0772 |
| Non-moving mass of 134.3 (75% of actuator base) | 0.0968 | 0.0819 |
| Non-moving mass of 269.5 (100% of actuator base) | 0.0482 | 0.0408 |
| Non-moving mass of 261.3 (75% of actuator base) | 0.0498 | 0.0421 |

What is claimed is:

1. An actuator for a tape drive, comprising:
a non-moving mass comprising:
at least two permanent magnets held inside a magnet bracket;
an inner pole piece positioned inside the magnet bracket between the at least two permanent magnets;
at least one bearing support rod attached to a front side of the inner pole piece;
a moving mass comprising: an actuator head assembly, the actuator head assembly having a coil positioned in a gap between the inner pole piece and the at least two permanent magnets, the moving mass configured to translate along an axis formed by the inner pole piece;
wherein the ratio of the moving mass over the non-moving mass is less than 0.120.

2. The actuator of claim 1, wherein the mass of the magnet bracket is at least 37 grams.

3. The actuator of claim 1, wherein the moving mass is between 10 grams and 14 grams.

4. The actuator of claim 1, wherein the non-moving mass is between 90 grams and 290 grams.

5. The actuator of claim 1, wherein the ratio of the moving mass over the non-moving mass is less than 0.050.

6. The actuator of claim 1, further comprises:
a base, wherein the magnet bracket and the inner pole piece are attached to a top side of the base;
wherein the at least one bearing support rod comprises a front bearing support rod attached to the front side of the inner pole piece and a rear bearing support rod attached to the top side of the base near a rear side of the inner pole piece;
two slugs positioned inside holes formed in the magnet bracket with the slugs contacting the top of the inner pole piece;
the non-moving mass further comprising: the mass of the front bearing support rod, the rear bearing support rod, the two slugs and the base.

7. The actuator of claim 6, wherein only 75% of the mass of the base is included in the non-moving mass.

8. The actuator of claim 1, wherein the frequency response of the actuator is less than −7 db at 2800 Hz.

9. The actuator of claim 1, wherein the actuator head assembly includes a read/write head for the tape drive.

10. An actuator for a tape drive, comprising:
a non-moving mass comprising:
at least two permanent magnets held inside a magnet bracket;
an inner pole piece positioned inside the magnet bracket between the at least two permanent magnets;
a base, wherein the magnet bracket and the inner pole piece are attached to a top side of the base;
a front bearing support rod attached to a front side of the inner pole piece;
a rear bearing support rod attached to the top side of the base near a rear side of the inner pole piece;
two slugs positioned inside holes formed in the magnet bracket with the slugs contacting the top of the inner pole piece;
a moving mass comprising and actuator head assembly, the actuator head assembly having a coil positioned in a gap between the inner pole piece and the at least two permanent magnets, the moving mass configured to translate along an axis formed by the inner pole piece;
wherein the non-moving mass is at least 100 grams.

11. The actuator of claim 10, wherein the moving mass is between 10 grams and 14 grams.

12. The apparatus of claim 10, wherein the magnet bracket has a mass of at least 70 grams.

13. The apparatus of claim 10, wherein only between 60 and 100% of the total mass of the base is included in the non-moving mass.

14. The apparatus of claim 10, wherein the non-moving mass is at least 130 grams.

15. An actuator for a tape drive, comprising:
a non-moving mass comprising:
at least two permanent magnets held inside a magnet bracket;
an inner pole piece positioned inside the magnet bracket between the at least two permanent magnets;
a base, wherein the magnet bracket and the inner pole piece are attached to a top side of the base;
a front bearing support rod attached to a front side of the inner pole piece;
a rear bearing support rod attached to the top side of the base near a rear side of the inner pole piece;
two slugs positioned inside holes formed in the magnet bracket with the slugs contacting the top of the inner pole piece;
a moving mass comprising and actuator head assembly, the actuator head assembly having a coil positioned in a gap between the inner pole piece and the at least two permanent magnets, the moving mass configured to translate along an axis formed by the inner pole piece;
wherein the frequency response of the actuator at 2800 Hz is less than −7 db.

* * * * *

UNITED STATES PATENT AND TRADEMARK OFFICE
CERTIFICATE OF CORRECTION

PATENT NO. : 8,390,959 B2
APPLICATION NO. : 13/070885
DATED : March 5, 2013
INVENTOR(S) : Donald J Fasen et al.

It is certified that error appears in the above-identified patent and that said Letters Patent is hereby corrected as shown below:

In the Claims

In column 6, line 28, in Claim 12, delete "apparatus" and insert -- actuator --, therefor.

In column 6, line 30, in Claim 13, delete "apparatus" and insert -- actuator --, therefor.

In column 6, line 33, in Claim 14, delete "apparatus" and insert -- actuator --, therefor.

Signed and Sealed this
Ninth Day of July, 2013

Teresa Stanek Rea
*Acting Director of the United States Patent and Trademark Office*